United States Patent
Uba et al.

(10) Patent No.: US 9,197,580 B2
(45) Date of Patent: Nov. 24, 2015

(54) DYNAMIC REDISTRIBUTION OF PERCENT ALLOCATED CALLS DURING OUTAGES

(71) Applicant: Avaya Inc., Basking Ridge, NJ (US)

(72) Inventors: Gene Masaru Uba, Broomfield, CO (US); Robert C. Steiner, Broomfield, CO (US); Tony McCormack, Galaway (IE)

(73) Assignee: Avaya Inc., Basking Ridge, NJ (US)

( * ) Notice: Subject to any disclaimer, the term of this patent is extended or adjusted under 35 U.S.C. 154(b) by 184 days.

(21) Appl. No.: 13/929,551

(22) Filed: Jun. 27, 2013

(65) Prior Publication Data

US 2015/0006947 A1    Jan. 1, 2015

(51) Int. Cl.
  H04M 7/00     (2006.01)
  H04L 12/923   (2013.01)
  H04L 29/08    (2006.01)
  H04L 29/14    (2006.01)

(52) U.S. Cl.
  CPC .......... *H04L 47/762* (2013.01); *H04L 67/1004* (2013.01); *H04L 67/1034* (2013.01); *H04L 69/40* (2013.01)

(58) Field of Classification Search
  USPC ................. 379/221.01, 221.03, 273
  See application file for complete search history.

(56) References Cited

U.S. PATENT DOCUMENTS

| 5,450,482 A * | 9/1995 | Chen et al. ................ 379/230 |
| 2010/0235218 A1 | 9/2010 | Erhart |
| 2010/0296417 A1 | 11/2010 | Steiner |
| 2011/0125793 A1 | 5/2011 | Erhart |
| 2011/0125826 A1 | 5/2011 | Erhart |
| 2011/0255683 A1 | 10/2011 | Flockhart |

FOREIGN PATENT DOCUMENTS

EP        1107559 B1    8/2008

OTHER PUBLICATIONS

Wikipedia definition for percentage value 1 page.*

* cited by examiner

*Primary Examiner* — Quynh Nguyen
(74) *Attorney, Agent, or Firm* — Sheridan Ross P.C.

(57) ABSTRACT

Work assignment methods and systems are provided that dynamically redistribute a percent allocation of contacts after an outage at a contact center. In general, a work assignment mechanism, upon receiving information that a contact center is removed from a system of available contact centers, dynamically recalculates a percentage allocation of each available contact center in the system. Subsequently received contacts are distributed among the available contact centers in accordance with the recalculated percentage allocation. When a contact center is returned to the system from an outage, the percentage allocation of contacts can be incrementally increased to the returning contact center.

20 Claims, 4 Drawing Sheets

DYNAMIC REDISTRIBUTION OF PERCENT ALLOCATED CALLS DURING OUTAGES

FIELD OF THE DISCLOSURE

The present disclosure is generally directed toward communications and more specifically toward contact centers.

BACKGROUND

Resource allocation systems have been developed for assigning work entries to resources according to various criteria. For example, customer contact centers receive requests for assistance or inquiries from customers, and distribute those requests and inquiries to agents within the contact center. Such systems may attempt to distribute work (e.g., requests for assistance or inquiries) to resources (e.g., agents, contact centers, etc.) by placing work entries corresponding to available work into a queue established for work entries having selected attributes or capabilities.

However, contact center outages can and do occur for a variety of reasons. For instance, a contact center, or site, may be taken down deliberately by an administrator so that elements, including software and hardware, may be upgraded or replaced. In some cases, the site may experience a component or software failure. This failure may be due to an overload of activity or contact traffic. In yet another example, the site may be the victim of a failure of a service provider network during an event like a natural disaster.

Typically, contact center systems have backup procedures in place that allow calls to move from a primary site to a secondary site in case of an outage. When a system attempts to route calls to a site that is down or unavailable for any reason, the calls are redirected to a backup site. This redirection of contacts is generally true for all of the contacts attempting to access the site that is down. In some instances, these calls may overwhelm the backup site as they are redirected without consideration for the backup site's load or real-time capability to handle the additional contacts and traffic. If the backup site becomes overloaded, the backup site may also go down (i.e., suffer an outage) and contacts may be disconnected. As can be appreciated, a domino effect may occur where one site overloads multiple sites with bulk call redistribution, causing a chain of outages.

SUMMARY

It is with respect to the above issues and other problems that the embodiments presented herein were contemplated. In general, embodiments of the present disclosure provide methods, devices, and systems that provide an adaptable and automatic dynamic redistribution capability to the call center administrator in the case of an outage. In some embodiments, the dynamic redistribution of calls may be managed by an algorithm. For example, each site may be assigned a numeric property, such as an "Active Weight" based on set percentages for percentage allocation for normal contact distribution. In one instance, the Active Weight may correspond to a percentage of contacts that are, or will be, distributed to a particular contact center or site in a system as compared to a total Active Weight of all sites in the system. Among other things, this numeric property may be used by a work assignment mechanism in allocating contacts to one or more contact centers.

Contact centers often use routing strategies to, among other things, allocate work during normal operations. A static percent allocation strategy is a routing strategy used by multi-site contact centers and/or administrators. In some embodiments, calls and other contacts made by a customer across a network are routed by a communication server to various contact center sites. This routing may be based on administrator-defined percentages. The percent allocation strategy may also give an administrator freedom to override routing settings based on changes in business needs and/or unforeseen occurrences. These percentages can be set for a site or a group. This strategy is generally employed to improve operational efficiency.

However, a typical and static percent allocation strategy is not an intelligent system. It does exactly what the administrator tells it to do at the time of administration, without any real-time considerations like load balancing, overload, and offline conditions. In contrast, a dynamic redistribution of percent allocated calls during outages using a new and flexible algorithmic solution redistributes calls based on weighted values for many sites. A numeric property used by the algorithm allows a system to automatically change call distribution in the event of an outage (planned or unplanned) and also allows a graceful recovery when the contact center, or site, comes back on line.

Business continuity for a contact center may be defined as maintaining or reestablishing critical business operations following a disruption. In some embodiments, the disruption may be associated with an interruption in a contact center's ability to handle contacts in accordance with expected, or predefined, criteria. Examples of these disruptions may include, but are not limited to, an outage, a natural disaster, system updates, overloads, and other events that may affect contact center operations.

Recovery is one element of business continuity that focuses on getting contact centers and/or systems up and running after a failure, disruption, or outage has occurred. It is an aspect of recovery to return contact centers and/or systems to an operational status as quickly as possible. An effective recovery strategy is one designed to provide operational hardware, software, and network resources, often at a secondary location, to minimize down time for agents and provide services to customers without disruption. Most critically, the backup environment should be designed to deliver the same experience as the production site for customers and agents.

In accordance with embodiments of the present disclosure, as contacts are received by a work assignment mechanism (e.g., module, contact center, communication server, and the like) of the system, the mechanism may distribute the received contacts to one or more contact center sites based on Active Weight and/or rules. A system may include a plurality of contact centers, or sites. For instance, a first contact center site may include an Active Weight that dictates a percent allocation of contacts equal to 20% of all received contacts. In this example 20% of received contacts will be distributed to the first contact center site by the work assignment mechanism. It is an aspect of the present disclosure, if the first contact center site suffers an outage, or other disruption, the Active Weight and the percent allocation will be updated for the first contact center site and all other sites in the system. As such, subsequent contact distributions will be governed by the new Active Weights and percent allocations in the system.

In some embodiments, an administrator, contact center, and/or a server may update the Active Weight value associated with a contact center site when the site (e.g., a primary site) is taken down, suffers an outage, or otherwise goes down. A change to the Active Weight can initiate a dynamic redistribution of calls based on secondary site properties. Once the primary site is functional again, the associated property Active Weight can be gradually incremented (e.g., by single increments, multiple increments, or combinations thereof) to return calls slowly to the primary site's originally assigned Active Weight.

Among other things, the dynamic redistribution of percent allocated calls during outages allows a number of contact center sites to share redirected contacts and traffic without placing a burden on a particular site according to static percent allocations. Moreover, gradually increasing contacts that are distributed to a reintroduced contact center site (e.g., one that previously suffered an outage) allows for live traffic testing and validation of the reintroduced site's functionality. Instead of a set, or static, redirection of contacts, the dynamic redistribution method allows for contact traffic to be shared by multiple contact center sites in a system in the event of an outage and can provide a metered recovery when a site is reintroduced to the system. In other words, the dynamic redistribution of percent allocated contacts during outages allows a system to react and manage outage routing, contact flows, load, and recovery automatically and gracefully.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
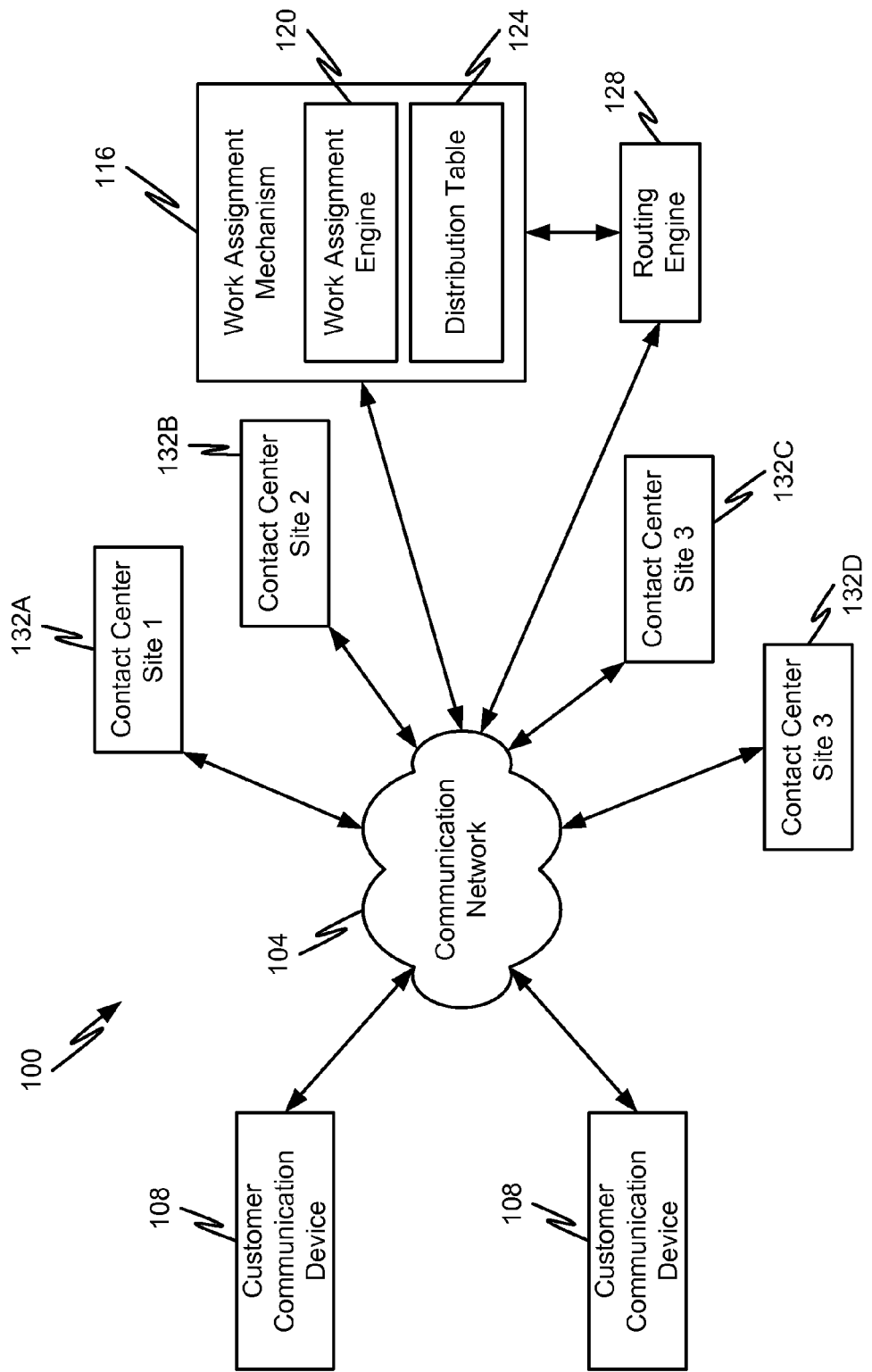
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering at least one contact center site 132A-D. Incoming work items (in the form of contacts) from the customer communication devices 108 may be distributed to one or more of the contact center sites 132A-D to be handled by various associated resources. As can be appreciated, the work assignment mechanism 116 may operate as a stand-alone module on the network. Additionally or alternatively, the work assignment mechanism 116 may reside on a communication server including, but not limited to, a contact center site 132A-D.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource associated with at least one contact center site 132A-D. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116).

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources of a contact center site 132A-D. The type of medium used by the communication device 108 to communicate with other communication devices 108 or processing resources may depend upon the communication applications available on the communication device 108.

In accordance with at least some embodiments of the present disclosure, the work item is sent toward a collection of processing resources associated with a contact center site 132A-D via the combined efforts of the work assignment mechanism 116 and routing engine 128. The resources can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers, and may include contact centers. As can be appreciated, once a work item is received by a contact center site 132A-D, the contact center site 132A-D may apply subsequent work assignment operations to direct the work item to an appropriate resource.

As discussed above, the work assignment mechanism 116 and resources may be owned and operated by a common entity in a contact center format. In some embodiments, the work assignment mechanism 116 may be administered by multiple enterprises, each of which has their own dedicated resources connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources and/or contact center sites is eligible and/or qualified to receive a work item and further determine which of the plurality of processing resources is best suited to handle the processing needs of the work item. In situations of work item surplus, the work assignment engine 120 can also make the opposite determination (i.e., determine optimal assignment of a work item to a resource). In some embodiments, the work assignment engine 120 is configured to achieve true one-to-one matching.

The work assignment engine 120 may reside in the work assignment mechanism 116 or in a number of different servers, contact center sites 132A-D, or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 120, the work assignment mechanism 116 may also comprise a distribution table 124. The distribution table 124 may be configured as a module that is capable of monitoring and analyzing a state associated with one or more contact center sites 132A-D. Contact center site states may include, but are not limited to, an "Active Weight," a percent allocation of contacts in a system, and other information relevant to contact center site 132A-D functionality and/or capability. The Active Weight may correspond to a numeric property, based on set percentages for percentage allocation of contacts in an enterprise or system that is associated with a contact center site 132A-D. In some embodiments, as the state of a contact center site 132A-D changes, the distribution table 124 may automatically update to include a current Active Weight, contact center condition, and even a percent allocation of contacts in the system associated with the contact center site 132A-D. It is anticipated that the distribution table 124 may be accessed by the work assignment engine 120 in determining the distribution of contacts among one or more contact center sites 132A-D.

It is an aspect of the present disclosure that the distribution table 124 may communicate with the work assignment mechanism 116, its components, and/or other contact center components (e.g., the routing engine 128, contact center sites 132A-D, and the like). Additionally or alternatively, the routing may include altering the assignment of a work item as directed by the work assignment engine 120. In other words, the distribution table 124 may be incorporated into the work assignment engine 120.

In some embodiments, each contact center site 132A-D may be configured to send information relating to its current state. Additionally or alternatively, each contact center site 132A-D may be configured to send updated state information to the distribution table 124, the work assignment mechanism 116 and/or its various components. For instance, if the Active Weight of a contact center site 132A-D changes for any reason, the contact center site 132A-D may send this update across the network 104 and change the value stored in the distribution table 124.

Figure 2:
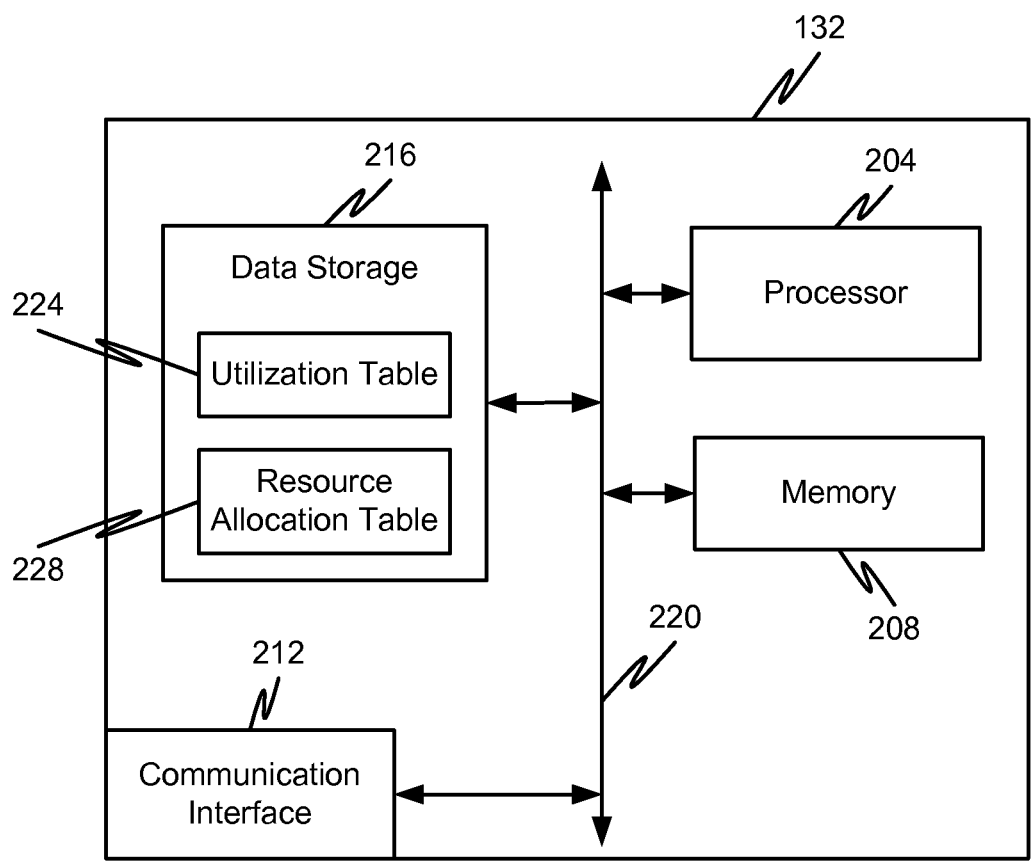
FIG. 2 is a block diagram depicting the components of a contact center site, in accordance with embodiments of the present disclosure.

FIG. 2 depicts a block diagram of the components of a communication server or contact center site 132 in accordance with embodiments of the present disclosure. In general, the contact center site 132 may include a processor 204, a memory 208, a communication interface 212, data storage 216, and a communication bus 220. The processor 204 may include any processor capable of performing instructions encoded in software. In accordance with another embodiment of the present disclosure, the processor 204 may comprise a controller or application specific integrated circuit (ASIC) having and capable of performing instructions encoded in logic circuits. For example, the processor 204 may perform or execute software or encoded instructions implementing the work assignment mechanism 116 function of the contact center, or communication system 100. As disclosed herein the work assignment mechanism 116, whether located on a communication server or contact center site 132 in whole or in part, may perform the dynamic redistribution of percent allocated contacts in a communication system 100.

The memory 208 may be used to store programs or data in connection with the running of programs or instructions on the processor 204. The memory 208 may comprise solid-state memory including, but not limited to, RAM, DRAM, SDRAM, etc. In addition, the distribution table 124 may be established in the memory 208, in whole or in part.

The communication interface 212 may provide an interconnection between the contact center site 132 and at least one of a customer communication device 108, communication server, a work assignment mechanism 116, a routing engine 128, and a contact center site 132A-D over a communication channel or network 104. As can be appreciated by one of skill in the art, a different communication interface 212 may be provided for each communication channel with which the contact center site 132 is interconnected.

Data storage 216 may include storage for programs and data. Similar to the memory 208, the data storage 216 may comprise a solid-state memory device or devices. Additionally or alternatively, the data storage 216 may comprise a hard disk drive or other random access memory. For instance, the data storage 216 may store rules, preferences, tables, and state information for one or more contact center sites 132 in the system 100. In addition, the data storage 216 may store a work assignment application, for instance where the work assignment mechanism 116 is encoded in software.

The data storage 216 may include a utilization table 224 and/or a resource allocation table 228. The work assignment mechanism 116 may refer to the utilization table 228 to determine an availability or state associated with a contact center site 132A-D. In some embodiments, the utilization table 224 may associate at least one value representing a utilization of one or more contact center sites 132A-D. Utilization may correspond to a percentage of available, busy, or otherwise engaged resources. For example, a utilization may indicate that a contact center site 132 has an available bandwidth for handling more work items or contacts. This available bandwidth may be represented as a percentage, a value, combinations thereof and the like. As such, the utilization of a specific contact center site 132A-D may be considered by a work assignment mechanism 116 in determining to direct work items or contacts. Additionally, the dynamic redistribution of contacts during a failure, outage, or interruption, may take into account the utilization of one or more contact center sites 132A-D in a system 100.

For instance, if a first contact center site 132A suffers an outage and the percentage of allocated contacts is recalculated and contacts are redistributed between the remaining contact center sites 132B-D online, the work assignment mechanism 116 may consider at least one utilization of the remaining contact center sites 132B-D in determining an appropriate distribution. Continuing this example, a second contact center site 132B may have available bandwidth equivalent to 80% of its total resources. In other words, the second contact center site 132B may only be utilizing 20% of its available resources. In this example, if another contact center site 132C-D has a lower available bandwidth, or higher utilization, the second contact center site 132B may be preferred in the allocation of contacts. As such, the percentage of allocated contacts may be increased for the second contact center site 132B. This increase may remain for a set period of time or automatically adjust upon meeting specific criteria and/or in response to another contact center site 132A, 132C-D changing state.

The data storage 216 may include a resource allocation table 228. Among other things, the resource allocation table 228 may include information relating to one or more resources associated with a contact center site 132A-D. The work assignment mechanism 116 may refer to the resource allocation table 228 to determine an availability or state associated with specific resources. Additionally or alternatively, the work assignment mechanism 116 may use the information in the resource allocation table 228 of one or more contact center sites 132A-D in dynamically redistributing percent allocated contacts in a system 100.

In some embodiments, the utilization and/or resource allocation of a contact center site 132A-D may be used to determine an Active Weight of the contact center site 132A-D. Additionally or alternatively, the Active Weight of a contact center site 132A-D may be set and/or adjusted by an administrator. For example, an administrator may set an Active Weight of a contact center site 132A-D to a "zero" value during an update or upgrade to install software, hardware, and/or additional resources to increase capability or efficiency. Among other things, this zero value can remove the contact center site 132A-D from dynamic distribution percent allocation calculations performed by a work assignment mechanism 116. The Active Weight value may be recorded in the distribution table 124 of the work assignment mechanism 116. In the event that a contact center site's 132A-D Active Weight value is changed, the new Active Weight may be sent to the work assignment mechanism 116 or retrieved by the work assignment mechanism 116 to be recorded in the distribution table 124.

Figure 3:
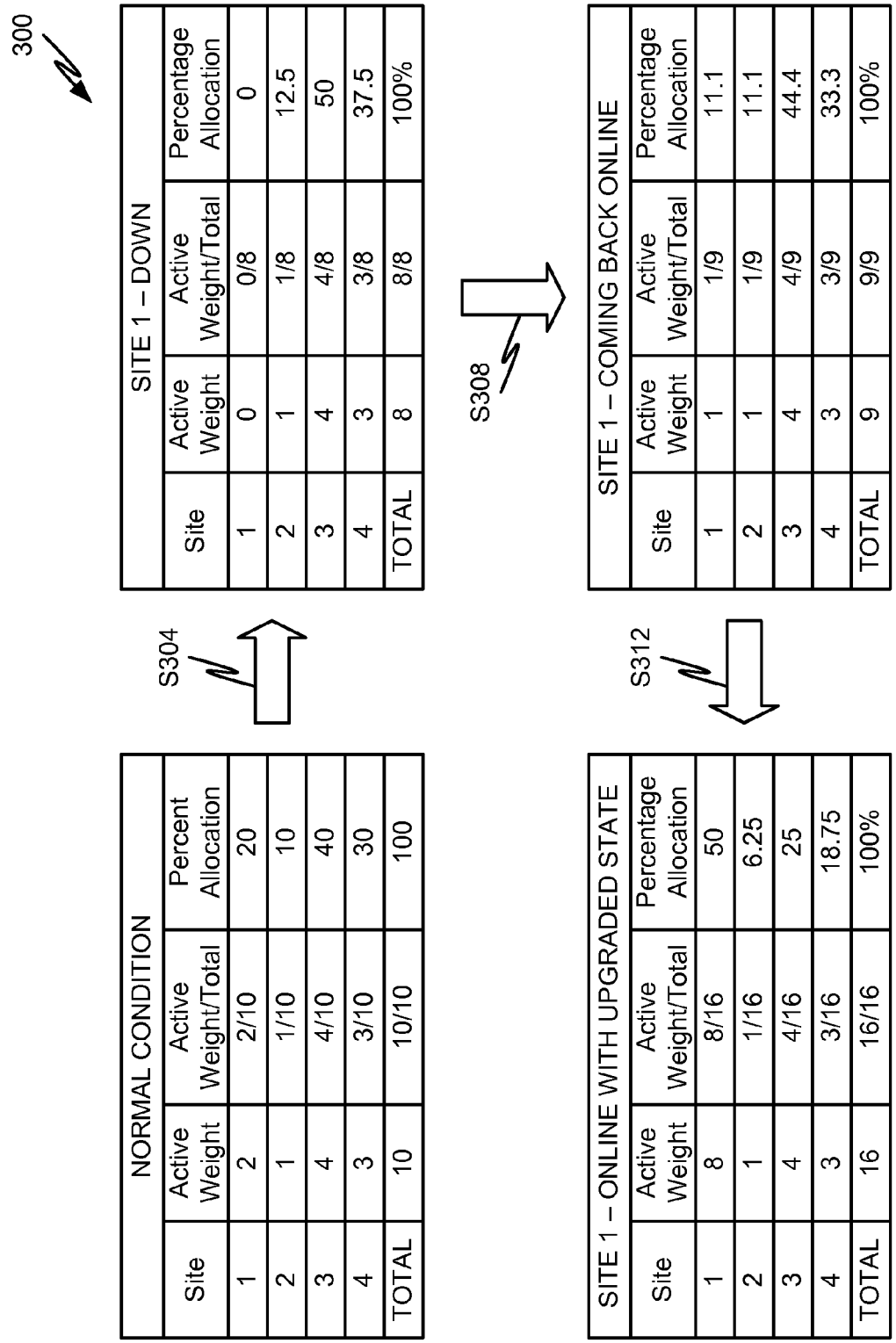
FIG. 3 is a first flow diagram depicting a method of dynamically redistributing percent allocated contacts in accordance with embodiments of the present disclosure.

Referring now to FIG. 3, a first flow diagram depicting a method 300 of dynamically redistributing percent allocated contacts is shown in accordance with embodiments of the present disclosure. A data structure is shown for an exemplary normal condition of a communication system 100 comprising four contact center sites. The data structure may include for each contact center site a site identifier, an Active Weight, an Active Weight compared to the total Active Weight of the system 100, and a percent allocation of contacts. In the example provided, Site 1 is associated with an Active Weight of "2" out of a total Active Weight of the system 100 of "10." Accordingly, the percent allocation of contacts for Site 1 of the system 100 is 20%. In other words, 20% of the contacts received by the system 100 will be distributed to Site 1. Continuing the example, Site 2 accounts for 10% of the allocated contacts, Site 3 accounts for 40%, and Site 4 accounts for 30%. As shown in FIG. 3, the total percentage allocation of contacts received by the system 100 and distributed between the four sites is 100%.

At step S304, Site 1 shows an Active Weight of "0." The contact center site may be subject to an outage, maintenance, failure, overload, administrative setting, or some other event to cause the Active Weight of the site to reflect a zero value. For example, an administrator may perform maintenance and/or upgrade operations on the site, and may need to take the contact center site offline. As such, the administrator may set the Active Weight of the site to "0." In another example, a natural disaster may cause an interruption in communications with a site (e.g., due to overload, communications failure, etc.) and as such, the work assignment mechanism 116 may determine that an Active Weight cannot be retrieved from the site. In such cases, an interruption may be detected and the Active Weight of the site may be set to a zero value via the work assignment mechanism 116. This setting may be made automatically in response to detecting the site condition. In some embodiments, when the Active Weight of a site is adjusted, the dynamic redistribution of percent allocated contacts may be initiated.

When the Active Weight of a site (e.g., Site 1 in the example shown) is set to zero, the total Active Weight of the system 100 is reduced by the same amount. For instance, the total Active Weight of the system 100 during normal conditions, or operation, shown in FIG. 3 is "10," where Site 1 accounts for an Active Weight of "2." In the event that the Active Weight of Site 1 is set to zero (i.e., a difference in Active Weight of two), then the total Active Weight of the system 100 is reduced by two. Accordingly, and as shown, the new total Active Weight of the system 100 is shown as eight. Once the new total Active Weight of the system 100 is adjusted, the work assignment mechanism 116 may calculate a new percent allocation of contacts for each contact center site 132A-D in the system 100. In some cases, the calculation may determine a new percent allocation of contacts for contact center site 132A-D with an Active Weight greater than zero.

Continuing the example provided above, the new percentage allocation of contacts with Site 1 down results in Site 2 accounting for 12.5% of the allocated contacts, Site 3 accounting for 50%, and Site 4 accounts for 37.5%. As shown in FIG. 3, the total percentage allocation of contacts received by the system 100 and distributed between the four sites remains at 100%, with Site 1 reflecting zero percent. In other words, utilizing a dynamic redistribution as disclosed above the three sites of the system 100 remaining with an Active Weight greater than zero can share the total system percentage allocation of calls. In contrast, traditional systems would shift all allocated contacts to a secondary site without sharing the load between contact center sites as shown. As can be appreciated by one of skill in the art, the work assignment mechanism 116 may store the information disclosed herein, and shown in the data structures of FIG. 3, in a distribution table 124, or memory. The distribution table 124 may be associated with at least one contact center site 132A-D, communication server, work assignment mechanism 116, and combinations thereof.

Step S308 represents a contact center site 132A-D or site coming back online after an outage as disclosed above. In some embodiments, a site coming back online after an outage may suffer reduced capabilities or capacity as a result of the outage. In other embodiments, a site may have been upgraded to handle an increased number of contacts. In either event, before a site is taken online and back to its original Active Weight or an increased Active Weight, the method 300 disclosed herein anticipates introducing contacts to the site gradually and/or incrementally. Among other things, this gradual introduction can allow the site to handle an allocation of contacts directed via a work assignment mechanism 116 without flooding the site after an outage. As the site handles the initial contacts it receives after the outage, the work assignment mechanism 116 may incrementally increase the Active Weight of the site to return the site to full operational condition. In some embodiments, the Active Weight of the site may be adjusted by single increments (e.g., 1) over time to prove the site is operational and capable of handling contact traffic.

In the example shown in FIG. 3, as Site 1 returns to an operational condition, the Active Weight of Site 1 starts at one. Accordingly, the total Active Weight of the system 100 may increase by one, to a total Active Weight of nine. Given the new total Active Weight of the system 100 and the new first increment Active Weight of Site 1, the new percent allocation of contacts shows Site 1 accounting for 11.1% of the allocated contacts, Site 2 accounting for 11.1%, Site 3 accounting for 44.4%, and Site 4 accounting for 33.3% (repeating numbers are cut off for clarity). As shown in FIG. 3, the total percentage allocation of contacts received by the system 100 and distributed between the four sites remains at 100%.

As disclosed above, a site may be upgraded to include additional capabilities or capacities. In this case, the site may qualify for an increased Active Weight when compared to its previous Active Weight. The Active Weight may be set by an administrator or via rules. At step S312, Site 1 is increased to a new Active Weight of eight. Increasing the Active Weight of Site 1 directly results in a proportional increase to the total Active Weight of the system 100. In this example, the total Active Weight of all the contact center sites (i.e., Sites 1-4) is increased to "16." The new percent allocation of contacts now shows upgraded Site 1 accounting for 50% of the allocated contacts, Site 2 accounting for 6.25%, Site 3 accounting for 25%, and Site 4 accounting for 18.75%. As shown, the total percentage allocation of contacts received by the system 100 and distributed between the four sites remains at 100%.

Figure 4:
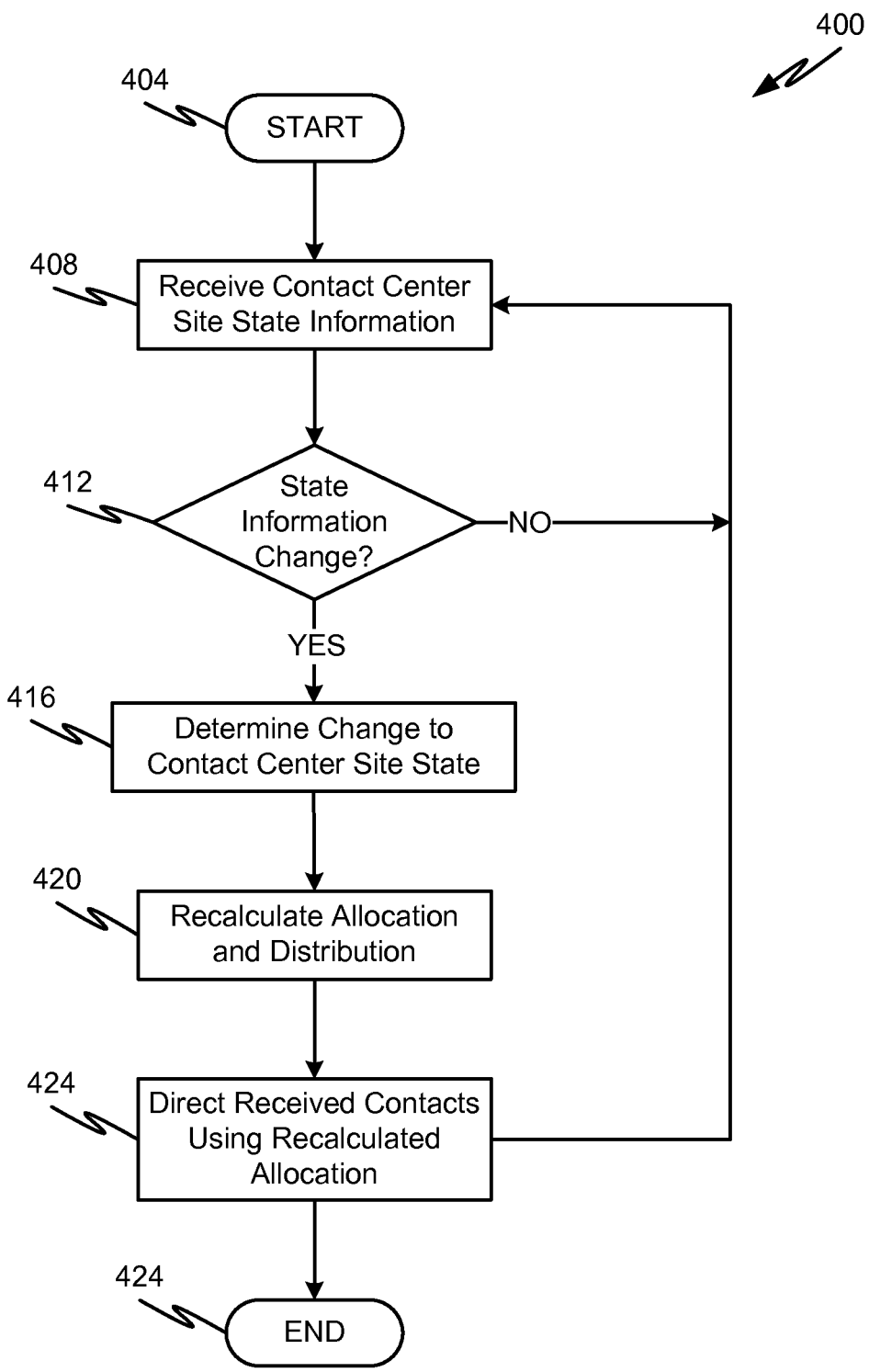
FIG. 4 is a second flow diagram depicting a method of dynamically redistributing percent allocated contacts in accordance with embodiments of the present disclosure.

FIG. 4, a second flow diagram is provided in accordance with embodiments of the present disclosure depicting a method 400 of dynamically redistributing percent allocated contacts. The method 400 begins at step 404 and proceeds by receiving contact center site 132A-D state information at the work assignment mechanism 116 (step 408). State information may include a condition associated with the contact center site 132A-D (e.g., online, offline, interrupted, maintenance, down, etc.), a capacity of the contact center site 132A-D (e.g., number of resources available, number of resources assigned, total number of resources, etc.), a utilization of the contact center site 132A-D (e.g., percentage of resources utilized, available, etc.), and combinations thereof.

In some embodiments, the state information may relate to an Active Weight assigned to contact center site 132A-D. As provided herein, the Active Weight of a contact center site 132A-D can be used to determine the percentage allocation of contacts. For example, a percentage is generated based on the Active Weight of a contact center site 132A-D divided by the total Active Weight of the system 100. The Active Weight may be set by an administrator or adjusted by rules. In the event that an Active Weight of a contact center site 132A-D cannot be retrieved by a work assignment mechanism 116 the Active Weight may be set to zero to indicate the lack of communication.

It is an aspect of the present disclosure that one or more of the work assignment mechanism 116, contact center site 132A-D, and communication server may retrieve state information or Active Weight from one or more contact center sites 132A-D in the communication system 100. For example, the work assignment mechanism 116 or contact center site 132A-D may communicate across a network 104 with one or more contact center sites 132A-D via a communication interface 212 to obtain an Active Weight. Once retrieved from the one or more contact center sites 132A-D, the Active Weight for each contact center site 132A-D may be stored in a memory associated with the work assignment mechanism 116. For instance, the Active Weight may be stored in the distribution table 124 of the work assignment mechanism 116.

In one embodiment, state information or Active Weight may be sent to the work assignment mechanism 116 by a contact center site 132A-D. Determining to send the Active Weight to the work assignment mechanism 116 may be based on changes to the Active Weight of a contact center site 132A-D. For instance, if an administrator takes a contact center site 132A-D site offline, the Active Weight may be set to zero. Upon changing the Active Weight, the contact center site 132A-D may send the updated information to the work assignment mechanism 116. In another embodiment, the work assignment mechanism 116 may monitor the Active Weight associated with a contact center site 132A-D and detect changes to the Active Weight as they occur. The monitoring performed by the work assignment mechanism 116 may be continuous or periodic (e.g., set to monitor for changes at timed intervals, etc.).

Next, the method 400 continues by determining whether the state information or Active Weight received by the work assignment mechanism 116, which may be part of a communication server or contact center site 132A-D, has changed from values stored in a memory associated with the work assignment mechanism 116 (step 412). In one embodiment, the Active Weight values of contact center sites 132A-D in a system 100 can be stored in a distribution table 124. The work assignment engine 120 may compare a received Active Weight of a contact center site 132A-D with its corresponding stored Active Weight in the distribution table 124 and determine whether a value is changed. In another embodiment, the Active Weight may be received by the work assignment mechanism 116 only if the Active Weight of the corresponding contact center site 132A-D has changed. In other words, when the Active Weight associated with a contact center site 132A-D is changed, the contact center site 132A-D sends the change of information (e.g., new Active Weight) to the work assignment mechanism 116. In this case, the Active Weight stored in the work assignment mechanism 116 may be automatically updated without comparing any values. If no state information change is detected the method 400 may return to step 408 and monitor for state information from a contact center site 132A-D. However, if a change to the state information, namely Active Weight, is found the method 400 may proceed at step 416.

The method 400 continues by determining details of the change to the contact center site 132A-D state (step 416). For example, if an Active Weight is set to zero for a contact center site 132A-D, the previous Active Weight of the contact center site 132A-D is removed from the total Active Weight of the system 100, while the zero Active Weight is not factored into the dynamic redistribution calculation performed by the work assignment engine 120. Additionally or alternatively, if an Active Weight of a contact center site 132A-D is increased (i.e., set to a number greater than zero), the increased Active Weight replaces the previous value stored in the work assignment mechanism or its associated components. In this example, the increased Active Weight is factored into the dynamic redistribution calculation performed by the work assignment engine 120. Additional details may include, but are not limited to, whether the contact center site 132A-D is being introduced from an outage, a capability associated with the contact center site, and other state information.

Based at least partially on the change associated with the contact center site 132A-D, the work assignment engine 120 recalculates the percentage allocation and contact distribution for the contact center sites 132A-D in the system 100 (step 420). Once the Active Weight of each available or online contact center site 132A-D is received, the work assignment engine 120 can calculate a percentage allocation of contacts for each available contact center site 132A-D. In one embodiment, the percentage allocation of contacts may be determined by dividing an individual contact center site's 132A-D Active Weight value by the total Active Weight of the system 100 and multiplying the result by "100." In this example, the total Active Weight of the system 100 equals the sum of the Active Weight of each available contact center site 132A-D in the system 100.

In some embodiments, the Active Weight of a contact center site 132A-D may be adjusted according to rules. For instance, a specific rule may direct that the Active Weight of a contact center site 132A-D returning online from a previous outage be gradually incremented over time. Among other things, this incremental adjustment to the Active Weight of the contact center site 132A-D allows contact traffic to be gradually introduced over a period of time instead of all at once.

The method 400 continues by directing and distributing contacts received using the recalculated percentage allocations (step 424). In some embodiments, the work assignment mechanism 116 may communicate with a routing engine 128 in distributing contacts among the various contact center sites 132A-D. In the event that a contact center site 132A-D is returning from an outage, the contacts may be incrementally distributed to the contact center site 132A-D returning from the outage. The Active Weight associated with the returning contact center site 132A-D may be increased over time, after a certain number of contacts, using other rules, or combinations thereof. Additionally or alternatively, the method 400 may continue by receiving contact center site 132A-D state information, updates to Active Weight, and other information at step 408. The method 400 may end at step 424.

It should be appreciated that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   determining, by a processor executing a work assignment mechanism at a first time, an Active Weight value of two or more contact center sites in a contact center, the Active Weight value for each site in the two or more contact center sites corresponding to a percentage of contacts to be received by each site as compared to all other sites in the contact center at the first time;
   detecting, by the processor executing the work assignment mechanism at a second time, that a first site of the two or more contact center sites assigned a first number of contacts has failed or become unable to receive contacts;
   determining, by the processor executing the work assignment mechanism, a redistributed percentage of allocated contacts for each of the two or more contact center sites apart from the first site based on a ratio of the Active Weight value for each site and a total number of contacts at the contact center at the second time excluding the first number of contacts; and
   distributing, by a processor executing a routing engine, contacts received in accordance with the determined redistributed percentage of allocated contacts among each of the two or more contact center sites to the exclusion of the first site.

2. The method of claim 1, wherein the redistributed percentage of allocated contacts is determined by at least dividing the Active Weight value of each of the two or more contact center sites by a system total Active Weight value, wherein the system total Active Weight value is equal to the sum of the Active Weight values associated with each of the two or more contact center sites that are online in the contact center.

3. The method of claim 1, wherein the Active Weight value is received in response to a state information request initiated by the work assignment mechanism.

4. The method of claim 1, wherein the Active Weight value is sent by the two or more contact centers to the work assignment mechanism.

5. A method, comprising:
   determining, by a processor executing a work assignment mechanism, an Active Weight value of one or more contact center sites in a contact center, the Active Weight value for each site in the one or more contact center sites corresponding to a percentage of contacts to be received by each site as compared to all other sites in the contact center;

detecting, by the processor executing the work assignment mechanism, that a first site has failed or become unable to receive contacts;

determining, by the processor executing the work assignment mechanism, a redistributed percentage of allocated contacts for each of the one or more contact center sites apart from the first site;

distributing, by a processor executing a routing engine, contacts received in accordance with the determined redistributed percentage of allocated contacts among each of the one or more contact center sites to the exclusion of the first site;

detecting, by the processor executing the work assignment mechanism, a change from an offline status of the first site to an online status of the first site, and in response thereto, changing an offline Active Weight value of the first site to an online Active Weight value, wherein the online Active Weight value represents that the first site is included in the allocated percentage of contacts;

determining, by the processor executing the work assignment mechanism, a second redistributed percentage of allocated contacts for each of the one or more contact center sites including the first site having the online Active Weight value; and distributing, by the processor executing the routing engine, contacts received in accordance with the determined second redistributed percentage of allocated contacts among each of the one or more contact centers and the first site.

6. The method of claim 5, wherein prior to determining the second redistributed percentage of allocated contacts, the method further comprises:

determining, by the processor executing the work assignment mechanism, that the first site has returned from the offline status, wherein the offline status is associated with the offline Active Weight value; and setting, by the processor executing the work assignment mechanism, the online Active Weight value associated with the first site to an introduction value, wherein the introduction value represents a value that is less than a full Active Weight value of the first site.

7. The method of claim 5, wherein the offline Active Weight value is set by an administrator associated with the first site.

8. The method of claim 6, wherein at least one of the offline Active Weight value, the online Active Weight value, the determined redistributed percentage of allocated contacts, the second redistributed percentage of allocated contacts, and a system total Active Weight value is stored in a distribution table associated with the work assignment mechanism.

9. The method of claim 6, wherein after distributing contacts received, the method further comprises:

incrementing, by the processor executing the work assignment mechanism, the introduction value of the first site based on at least one of the time since the first site has returned from the offline condition and a number of contacts distributed.

10. The method of claim 9, wherein the introduction value is incremented to the full Active Weight value over time.

11. A non-transitory computer readable medium having stored thereon instructions that, when executed by a processor, perform a method comprising:

determining, by the processor executing a work assignment mechanism at a first time, an Active Weight value of two or more contact center sites in a contact center, the Active Weight value for each site in the two or more contact center sites corresponding to a percentage of contacts to be received by each site as compared to all other sites in the contact center at the first time;

detecting, by the processor executing the work assignment mechanism at a second time, that a first site of the two or more contact center sites assigned a first number of contacts has failed or become unable to receive contacts;

determining, by the processor executing the work assignment mechanism, a redistributed percentage of allocated contacts for each of the two or more contact center sites apart from the first site based on a ratio of the Active Weight value for each site and a total number of contacts at the contact center at the second time excluding the first number of contacts; and distributing, by a processor executing a routing engine, contacts received in accordance with the determined redistributed percentage of allocated contacts among each of the two or more contact center sites to the exclusion of the first site.

12. The non-transitory computer readable medium of claim 11, wherein the method further comprises:

detecting, by the processor executing the work assignment mechanism, a change from an offline status of the first site to an online status of the first site, and in response thereto, changing an offline Active Weight value of the first site to an online Active Weight value, wherein the online Active Weight value represents that the first site is included in the allocated percentage of contacts;

determining, by the processor executing the work assignment mechanism, a second redistributed percentage of allocated contacts for each of the two or more contact center sites including the first site having the online Active Weight value; and distributing, by the processor executing the routing engine, contacts received in accordance with the determined second redistributed percentage of allocated contacts among each of the two or more contact centers and the first site.

13. The non-transitory computer readable medium of claim 11, wherein the redistributed percentage of allocated contacts is determined by at least dividing the Active Weight value of each of the two or more contact center sites by a system total Active Weight value, wherein the system total Active Weight value is equal to the sum of the Active Weight values associated with each of the two or more contact center sites that are online in the contact center.

14. The non-transitory computer readable medium of claim 12, wherein prior to determining the second redistributed percentage of allocated contacts, the method further comprises:

determining, by the processor executing the work assignment mechanism, that the first site has returned from the offline status, wherein the offline status is associated with the offline Active Weight value; and setting, by the processor executing the work assignment mechanism, the online Active Weight value associated with the first site to an introduction value, wherein the introduction value represents a value that is less than a full Active Weight value of the first site.

15. The non-transitory computer readable medium of claim 12, wherein the offline Active Weight is set by an administrator associated with the first site.

16. The non-transitory computer readable medium of claim 13, wherein at least one of the offline Active Weight value, the online Active Weight value, the determined redistributed percentage of allocated contacts, the second redistributed percentage of allocated contacts, and a system total Active Weight value is stored in a distribution table associated with the work assignment mechanism.

17. The non-transitory computer readable medium of claim 13, wherein after distributing contacts received, the method further comprises:
   incrementing, by the processor executing the work assignment mechanism, the introduction value of the first site based on at least one of the time since the first site has returned from the offline condition and a number of contacts distributed.

18. The non-transitory computer readable medium of claim 17, wherein the introduction value is incremented to the full Active Weight value over time.

19. A contact center, comprising:
   a processor; and
   a work assignment mechanism contained in memory and executed by the processor, the work assignment mechanism including:
      a processor executable work assignment engine that determines at a first time an Active Weight value of two or more contact center sites in the contact center, the Active Weight value for each site in the two or more contact center sites corresponding to a percentage of contacts to be received by each site as compared to all other sites in the contact center at the first time, detect at a second time that a first site of the two or more contact center sites assigned a first number of contacts has failed or become unable to receive contacts, determine a redistributed percentage of allocated contacts for each of the two or more contact center sites apart from the first site based on a ratio of the Active Weight value for each site and a total number of contacts at the contact center at the second time excluding the first number of contacts; and
      a routing engine that distributes contacts received in accordance with the determined redistributed percentage of allocated contacts among each of the two or more contact center sites to the exclusion of the first site.

20. The contact center of claim 19, wherein the work assignment mechanism detects a change from an offline status of the first site to an online status of the first site, and in response thereto, change an offline Active Weight value of the first site to an online Active Weight value, wherein the online Active Weight value represents that the first site is included in the allocated percentage of contacts, determine a second redistributed percentage of allocated contacts for each of the two or more contact center sites including the first site having the online Active Weight value, and wherein the routing engine is further configured to distribute contacts received in accordance with the determined second redistributed percentage of allocated contacts among the two or more contact centers and the first site.

* * * * *